United States Patent
Fisch et al.

[11] Patent Number: 6,158,637
[45] Date of Patent: Dec. 12, 2000

[54] ROOF RAIL FOR VEHICLES

[75] Inventors: Fritz Fisch, Wuppertal; Wilfried Koch, Rauschenberg, both of Germany

[73] Assignee: JAC Products Deutschland GmbH, Wuppertal, Germany

[21] Appl. No.: 09/384,331

[22] Filed: Aug. 27, 1999

[30] Foreign Application Priority Data

Sep. 2, 1998 [DE] Germany ............ 198 39 937

[51] Int. Cl.$^7$ ..................................... B60R 9/04
[52] U.S. Cl. ............................ 224/309; 224/322
[58] Field of Search .................. 224/309, 322, 224/329, 545, 547, 555, 557; 439/34

[56] References Cited

U.S. PATENT DOCUMENTS

| | | | |
|---|---|---|---|
| 5,306,156 | 4/1994 | Gibbs et al. | 439/34 |
| 5,617,981 | 4/1997 | Ricker et al. | 224/309 |
| 5,624,266 | 4/1997 | Gibbs et al. | |
| 5,699,944 | 12/1997 | Duran | 224/326 |
| 6,089,427 | 7/2000 | Evels et al. | 224/309 |

FOREIGN PATENT DOCUMENTS

| | | |
|---|---|---|
| 3440477 C2 | 7/1988 | Germany . |
| 94 07 765 | 12/1994 | Germany . |
| 198 39 937 | 9/1998 | Germany . |
| 197 13 781 A1 | 10/1998 | Germany . |
| 682003 A5 | 7/1988 | Switzerland . |

*Primary Examiner*—Stephen K. Cronin
*Attorney, Agent, or Firm*—Harness, Dickey & Pierce, PLC

[57] ABSTRACT

A roof rail for vehicles is described, having a strut (3), which is carried by at least two supporting feet (2), and having a fastening assembly, which is assigned to each supporting foot (2), for fastening it to a non-removable bearing structure (5) on the vehicle, such as a roof channel bottom (6), roof frame, bow or the like. The fastening assembly has a bolt (7) which is arranged on the supporting foot (2), and which is inserted through a hole (8) in the bearing structure (5) and is secured on the bearing structure (5) via a spring element of the fastening assembly. For the purpose of obtaining a simple installation having a snap lock, the bolt (7) to has a radial groove (9) and the spring element (10), which is arranged on the bearing structure (5) and which can be latched into the radial groove (9), to be provided as the fastening means.

23 Claims, 3 Drawing Sheets

ROOF RAIL FOR VEHICLES

TECHNICAL FIELD

The invention relates to a roof rail for vehicles.

BACKGROUND OF THE INVENTION

In the case of a roof rail disclosed by DE 31 12 086 A1 each supporting foot is assigned a fastening device for fastening it to a non-removable bearing structure on the vehicle. The fastening device comprising a bolt which passes through a hole in the bearing structure and has an external thread and, as fastening means, a threaded nut which can be screwed onto the external thread. Although the known fastening is proven in practice, it no longer satisfies the current requirements of the customers. The reason for this is the relatively complicated installation and, in particular, the necessity of having to attach the roof rail to the vehicle before the roof lining is installed.

SUMMARY OF THE INVENTION

The present invention is based on the object of providing a roof rail of the type mentioned at the beginning which can be installed, in particular even after the roof lining is fitted, rapidly and simply without particular expenditure of energy.

To achieve this object, the invention makes provision of the measures described herein, while the subclaims characterize advantageous developments and expedient refinements of the invention.

According to the invention, a fastening assembly including a bolt is provided having a radial groove, i.e. a groove extending transversely to the longitudinal axis, and at least one spring element, which is arranged on a bearing structure and which can be latched into the radial groove, and which forms the fastening assembly. The measures according to the invention facilitate an installation of the roof rail which can be brought about extremely rapidly and simply, and merely requires the roof rail to be placed onto a vehicle roof and the bolts of the supporting feet to be inserted into the holes in the bearing structure. The installation procedure is immediately at an end if the spring element latches into the radial groove, which is preferably designed as an annular groove, with a readily audible clicking noise. The only preliminary work to be done is to fasten the spring element to the bearing structure, but this can advantageously already take place on the body shell. The invention therefore provides the advantage of a considerable saving of effort and time, and also makes it possible for the roof rail to be installed on the finished vehicle as the component to be installed last, this type of installation having been demanded by the customers for a long time.

A refinement of the invention makes provision for the arrangement of the at least one spring element to be made in such a manner that the bolt, as it is being installed, causes the spring element to be forced counter to the spring force until it latches into the radial groove. The spring element can therefore be arranged without prestressing being used, i.e., by simply fitting it on the bearing structure.

Provision may particularly advantageously be made for the spring element to be designed as a spring wire section and to be supported counter to the insertion direction of the bolt, and furthermore to be supported in an axially movable manner a short distance from its ends. Because of the support on the underside, the spring wire can only yield outward, i.e., away from the bolt, and slide along the bolt shank until it latches into the radial groove. It is preferable to make the arrangement in such a manner that the spring wire sits in a pretensioned manner in the radial groove, in order to eliminate shaking or production of noise.

A preferred embodiment of the invention may consist of a spring element being provided which consists of a spring wire section which is bent in a U shape, and which has two spring legs which touch the bolt on diametrically opposite sides, and which can be latched into the radial groove. In this arrangement, one or both spring legs can be supported on the underside by the non-removable bearing structure on the vehicle and on the upperside, and also on the outside by angled hooks. The angled hooks may be separate components or may consist of cut-free, correspondingly bent tongues of the body sheet or the bearing structure.

Provision is preferably made for the spring element to be arranged in a housing which can be fastened, and also welded, to the bearing structure, and which has a through opening for the bolt. For securing the housing on the bearing structure, a screw connection having weld nuts on the underside of the bearing structure is also a desirable choice, because securing it in this manner offers the advantage of being able to remove it, if necessary, without particular effort.

In order to assist the production of the insert and latch connection, the free end of the bolt, which end is adjacent to the radial groove, is preferably of conical or rounded design

BRIEF DESCRIPTION OF THE DRAWINGS

An exemplary embodiment of the invention is explained in more detail below with reference to the drawings, in which.

DETAILED DESCRIPTION OF THE PREFERRED EMBODIMENTS

Figure 1:
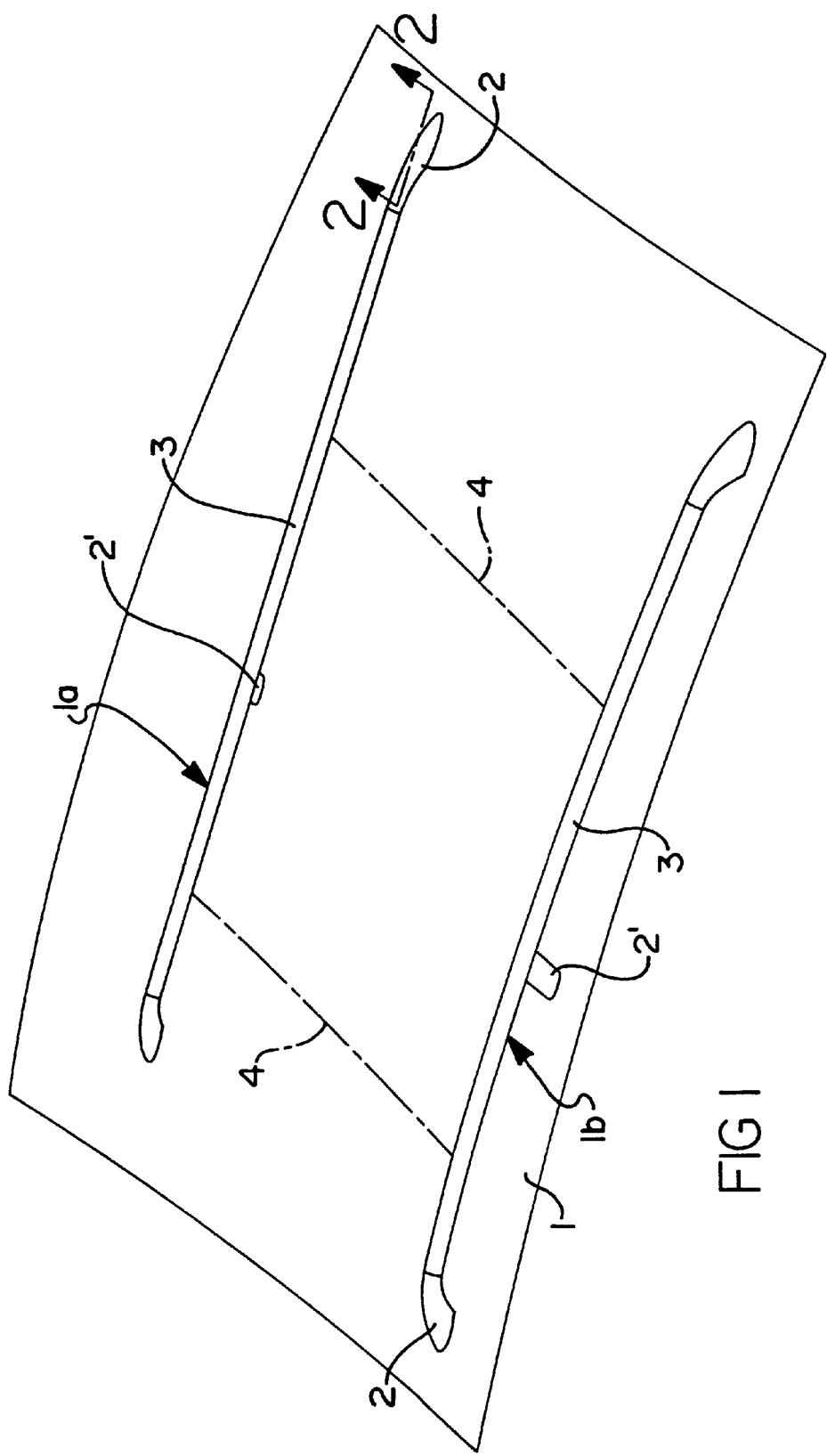
FIG. 1 shows a roof rail incorporating the present invention with supporting feet and struts mounted on a vehicle roof.
Figure 2:
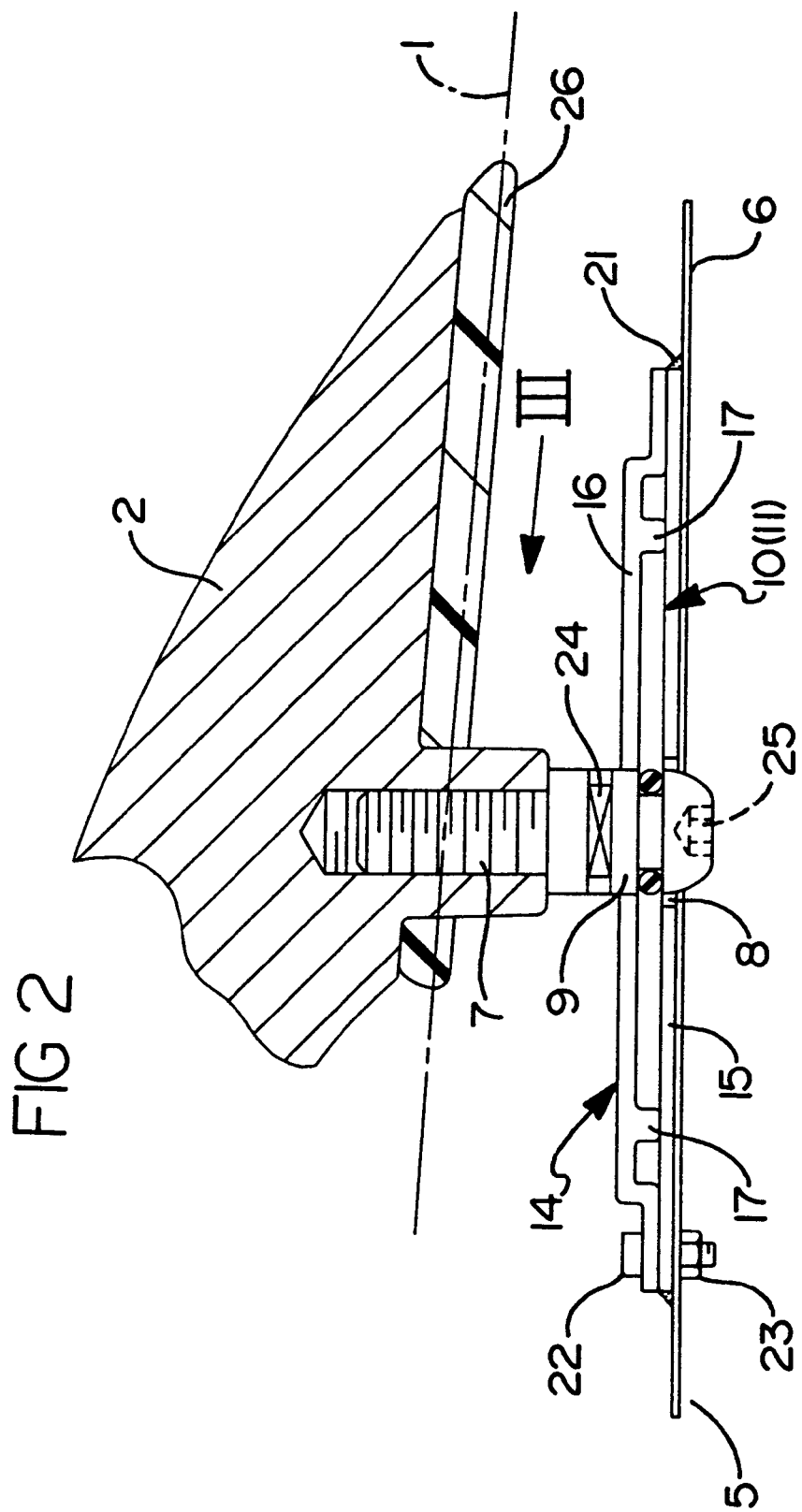
FIG. 2 shows a longitudinal section in accordance with section line 2—2 in FIG. 1 through a supporting foot of the roof rail installed on a vehicle roof.
Figure 3:
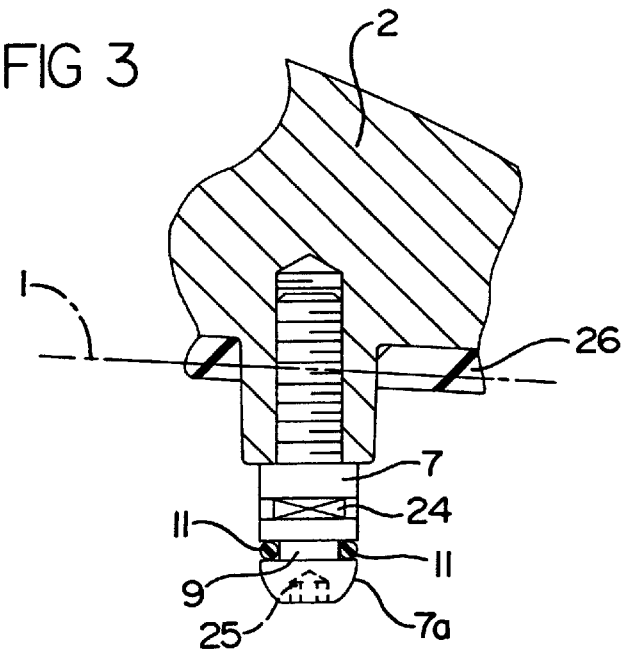
FIG. 3 shows the fastening of the supporting foot, as seen in the arrow direction III in FIG. 2.
Figure 4:
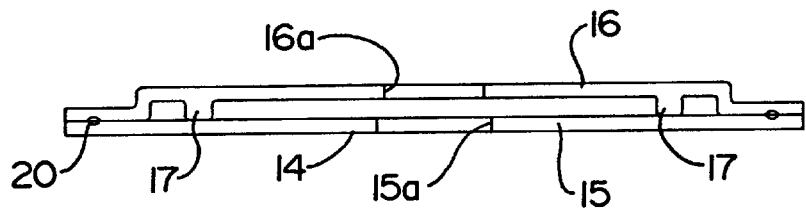
FIG. 4 shows a side elevational view of the spring housing of the present invention.

FIG. 1 shows the roof skin 1 of a vehicle with a roof rack 1a arranged on it. The roof rack 1a is formed from two roof rails 1b, each consisting of supporting feet 2 and struts 3, and also from cross members 4 (only shown by dash-dotted lines) which are fastened to the struts 3. The roof rails 1b extend at least approximately parallel to each other and run in the direction of travel of the vehicle. In the case of longer struts 3, the inclusion of an intermediate supporting foot 2' on each roof rail 1b is preferred.

Each supporting foot 2, 2' is formed with a fastening device 1c, which can be seen in FIGS. 2 to 5, on a non-removable bearing structure 5 on the vehicle, such as a roof channel bottom. The bearing structure 5 may also be a root frame (not shown), a bow (not shown) or the like. The fastening device 1c comprises in part a bolt 7 and a spring housing assembly 14. The bolt 7 is arranged on the supporting foot 2, and passes the spring housing assembly 14 and through a hole 8 in the bearing structure 5. The spring housing assembly 14 has a spring element 10 which is arranged on the bearing structure 5 and which can latch into a radial groove 9, designed as an annular groove, of the bolt 7, to achieve fastening of the bolt 7 to the spring housing assembly 14.

In the simplest case the spring element 10 consists of a rectilinearly extending spring wire section 11. It is also conceivable to provide two spring wire sections 11 which run parallel to each other and hold the bolt 7 between them. In both cases only a lower support, for example, directly on the bearing structure 5, and a lateral support at the end regions are required. The insertion of the bolt 7 into the hole 8 initially causes the one, or each, spring wire section 11 to bend outwardly in the central region before it then snaps into the radial groove 9 of the bolt 7, since it attempts, as a consequence of its inherent spring force, to take up its straight initial position again.

Figure 5:
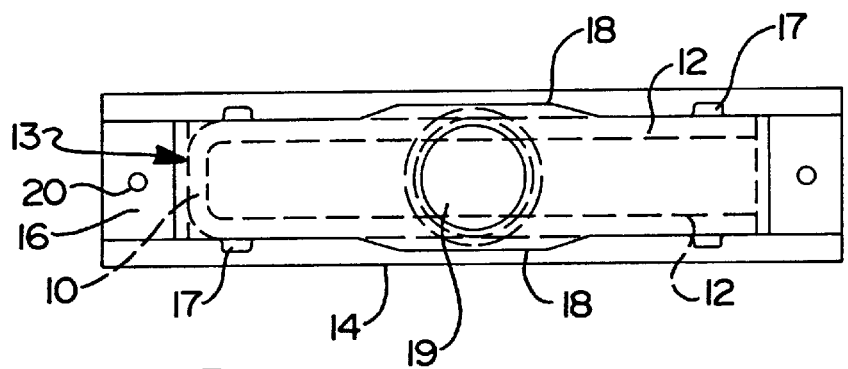
FIG. 5 shows a plan view of the spring housing in accordance with directional arrow 5—5 in FIG. 4.

In a preferred embodiment of the spring housing assembly 14, the spring element 10 preferably consists of a single spring wire section which, as can be seen in particular in FIG. 5, is designed in a U shape and comprises two spring legs 12 and a web 13 connecting the latter to each other. This spring element 10 is arranged in the sheet-metal housing assembly 14, which has a bottom sheet 15 and a cover sheet 16. The bottom sheet 15 includes a hole 15a which is aligned with a hole 16a in the cover sheet 16. The arrangement in this case is made in such a manner that the spring legs 12 are supported at the particular end regions by bent sheet-metal tongues 17 of the cover sheet 16. The introduction of the bolt 7 causes the spring legs 12 to spread apart (as is indicated by reference numbers 18) at the areas thereof adjacent, the supports 17 causing spring tension to build up which is then immediately relieved when the radial groove 9 comes to the same height of the spring legs 12. In that case, the spring legs namely snap into the radial groove 9 and secure the bolt 7, and therefore the supporting foot 2 and the entire roof rail.

The free end of the bolt 7 is of conical Or rounded design in order to facilitate the insertion through the holes 15a and 16a, into the space between the spring legs 12 to be spread and into the hole 8 in the bearing structure 5. The transition into the radial groove 9 takes place, as seen from the free end of the bolt 7, via a radius 7a which assists the snapping-in of the spring element 10. The opposite transition the radial groove of the bolt 7 shank is, in contrast, designed as a sharp-edged undercut, it is impossible to pull the bolt 7 out of the spring element 10 once it engages in the radial groove 9.

The sheet-metal housing assembly 14 essentially forms a cage for the spring element 10, for which purpose the bottom sheet 15 and cover sheet 16 are secured to each other, for example, by means of spot-welding at points 20. The sheet-metal housing 14 may be secured on the bearing structure 5 by means of a weld connection 21 (shown on the right in FIG. 2) or by means of a screw connection 22 (shown on the left in FIG. 2). In the case of a screw connection 22, it is recommended to arrange a weld nut 23 on the underside of the bearing structure 5 or possibly to form a threaded passage.

The bolt 7 is expediently fastened in the supporting foot 2 by screwing, for which purpose engagement surfaces 24 and/or 25 are formed on the bolt 7.

The through openings (holes 8, 15a and 16a) for the bolt 7 of one of the supporting feet 2, 2' of each roof rail are to be marched to the bolt 7 diameter, while the through openings for each further supporting toot 2, 2' are to be designed in the manner of a slot. In this manner, on the one hand, the roof rail 1b is arranged on a vehicle roof in a manner secure against displacement and, on the other hand, there is the possibility of counterbalancing constructional tolerances. Compensating for tolerances in the axial direction of the bolt 7 is achieved by a backing 26 made of compressible material and arranged on each supporting foot 2, 2'.

What is claimed is:

1. A roof rail apparatus adapted to be secured to an outer body surface of a vehicle, comprising:
    a roof rail having at least one supporting foot portion;
    a fastening assembly for securing said foot portion to said outer body surface of said vehicle, said fastening assembly comprising:
        a bolt fixedly secured to said foot portion so as to protrude outwardly therefrom, said bolt having an engaging portion;
        a housing assembly secured to said outer body surface, said housing assembly including a spring member for snappingly engaging said engaging portion of said bolt when said bolt is urged toward and against said spring member, to thereby captively hold said bolt to said housing assembly and thereby hold said roof rail to said outer body surface.

2. The apparatus of claim 1, wherein said bolt includes a radiused end portion adjacent said engaging portion for facilitating engagement with said spring member.

3. The apparatus of claim 1, wherein said bolt includes a portion adapted to be engaged with an external tool such that said bolt can be turned with said tool.

4. The apparatus of claim 1, wherein said engaging portion of said bolt comprises a radial groove formed near a terminal portion of said bolt.

5. The apparatus of claim 1, wherein said housing assembly comprises:
    a bottom member;
    a top member having an opening; and
    wherein said spring member is captured inbetween said top and bottom members such that a portion of said bolt having said engaging portion extends through said opening in said top member such that said engaging portion is able to engage said spring member.

6. The apparatus of claim 5, wherein said top member includes at least one tongue for engaging said spring member to assist in biasing said spring member into engagement with said engaging portion of said bolt.

7. The apparatus of claim 1, wherein said spring member comprises a generally U-shaped spring.

8. The apparatus of claim 7, wherein said U-shaped spring member includes a pair of spring legs, and wherein said bolt is inserted inbetween said spring legs such that each of said spring legs are initially urged outwardly slightly away from each other by said bolt before snapping into engagement with said engaging portion of said bolt.

9. The apparatus of claim 8, herein said engaging portion comprises a radial groove formed adjacent a terminal end portion of said bolt.

10. A roof rail for a vehicle article adapted to be secured to an outer body surface of a vehicle, said roof rail comprising:
    a foot portion;
    a fastening assembly for securing said foot portion to said outer body surface of said vehicle, said fastening assembly comprising:
        a bolt fixedly secured to foot portion so as to protrude outwardly therefrom, said bolt having an engaging portion adjacent a terminal end portion thereof;

a housing assembly secured to said outer body surface, said housing assembly including a housing and a spring member disposed within said housing, said housing having an opening for accepting a portion of said bolt such that said portion may be inserted into said housing and into contact with said spring member such that said spring member snappingly engages said engaging portion of said bolt, to thereby secure said foot portion to said outer body surface of said vehicle.

11. The roof rail of claim 10, wherein said engaging portion comprises a radial groove formed adjacent a terminal portion of said bolt.

12. The roof rail of claim 10, wherein said bolt comprises a radiused end portion to assist in facilitating engagement with said engaging portion.

13. The roof rail of claim 10, wherein said housing assembly includes an opening for permitting a portion of said bolt to extend completely therethrough.

14. The roof rail of claim 10, wherein said spring member comprises a generally U-shaped spring member having a pair of spring legs; and wherein said engaging portion comprises a radial groove formed in said bolt adjacent an end portion of said bolt; and wherein said end portion of said bolt engages portions of said spring legs to initially spread said legs apart upon a first degree of insertion of said bolt between said spring legs, and said legs snapping into engagement in said radial groove upon a second degree of insertion of said bolt through said spring member.

15. The roof rail of claim 14, wherein said end portion of said bolt comprises a radiused end portion for facilitating insertion of said end portion between said legs of said spring member.

16. The roof rail of claim 10, wherein said housing comprises a top member and a bottom member; and wherein said spring member is disposed inbetween said top and bottom members.

17. The roof rail of claim 16, wherein said spring member comprises a U-shaped spring having a pair of generally parallel disposed legs.

18. The roof rail of claim 17, wherein said top member comprises a pair of tongue portions adapted to engage each of said leg portions to assist in biasing said leg portions of said spring member into engagement with said engaging portion of said bolt.

19. A vehicle article carrier adapted to be secured to an outer body surface of a vehicle to support articles thereon, said vehicle article carrier comprising:

a pair of roof rails disposed generally parallel to one another on said outer body surface, each of said roof rails including a strut portion and a pair of foot portions for supporting their associated strut portions elevationally above said outer body surface;

at least one of said foot portions of each said roof rail including:

a fastening assembly comprising a bolt secured to said foot portion and a housing assembly secured to said outer body surface;

said bolt having an engaging portion;

said housing assembly having a spring member disposed therein;

and wherein said bolt operates to contact said spring member when said bolt is urged into said housing assembly and to displace a portion of said spring member upon a first degree of insertion, and to cause said spring member to snappingly engage within said engaging portion upon a second degree of insertion of said bolt within said housing assembly.

20. The vehicle article carrier of claim 19, wherein said engaging portion comprises a radial groove formed adjacent a terminal end portion of said bolt.

21. The vehicle article carrier of claim 19, wherein said spring member comprises a generally U-shaped spring member.

22. The vehicle article carrier of claim 19, wherein said housing assembly comprises a top member and a bottom member, and wherein one of said top or bottom members comprises at least one tongue portion for engaging a portion of said spring member and biasing said spring member into contact with said engaging portion.

23. The vehicle article carrier of claim 19, wherein said bolt includes a radiused terminal end portion for facilitating engagement with said spring member.

\* \* \* \* \*